(12) United States Patent
Ayub et al.

(10) Patent No.: US 10,255,071 B2
(45) Date of Patent: Apr. 9, 2019

(54) METHOD AND APPARATUS FOR MANAGING A SPECULATIVE TRANSACTION IN A PROCESSING UNIT

(71) Applicant: International Business Machines Corporation, Armonk, NY (US)

(72) Inventors: Salma Ayub, Austin, TX (US); Susan E. Eisen, Round Rock, TX (US); Glenn O. Kincaid, Austin, TX (US); Cliff Kucharski, Austin, TX (US); Christopher M. Mueller, Pflugerville, TX (US); Dung Q. Nguyen, Austin, TX (US); David R. Terry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/883,420

(22) Filed: Oct. 14, 2015

(65) Prior Publication Data
US 2017/0109168 A1    Apr. 20, 2017

(51) Int. Cl.
*G06F 9/30*       (2018.01)
*G06F 12/0875*    (2016.01)
*G06F 12/0891*    (2016.01)

(52) U.S. Cl.
CPC ...... *G06F 9/30098* (2013.01); *G06F 12/0875* (2013.01); *G06F 12/0891* (2013.01); *G06F 2212/604* (2013.01)

(58) Field of Classification Search
CPC ............. G06F 9/30098; G06F 12/0875; G06F 12/0891; G06F 2212/604; G06F 9/3842; G06F 9/3863; G06F 9/3844; G06F 9/467
See application file for complete search history.

(56) References Cited

U.S. PATENT DOCUMENTS 5,384,567 A    1/1995  Hassner et al.
5,586,294 A    12/1996 Goodwin et al.
(Continued)

FOREIGN PATENT DOCUMENTS

GB    2215883 A    9/1989

OTHER PUBLICATIONS

International Business Machines Corporation, "List of IBM Patents or Patent Applications Treated as Related," Oct. 15, 2015, 2 pages.
(Continued)

*Primary Examiner* — Benjamin P Geib
*Assistant Examiner* — Andrew J Cromer
(74) *Attorney, Agent, or Firm* — Patterson + Sheridan, LLP

(57) ABSTRACT

Method and system for managing a speculative transaction in a processing unit is provided. The speculative transaction is initiated by dispatching a first instruction indicating start of the speculative transaction. One or more register file (RF) entries are marked as pre-transaction memory (PTM), in response to the initiating. At least one second instruction targeting at least one of the marked RF entries is dispatched, while the transaction is active, wherein the at least one second instruction writes new result data into the at least one RF entry. Previous result data evicted from the at least one RF entry by the new result data, is saved into a history buffer (HB) entry. The HB entry is marked as PTM, in response to the saving, wherein the processing unit, upon detecting a trigger, is rolled back to a state before the initiating the transaction by restoring the previous result data to the at least one RF entry.

20 Claims, 10 Drawing Sheets

(56) References Cited

U.S. PATENT DOCUMENTS

| | | | |
|---|---|---|---|
| 5,765,016 A * | 6/1998 | Walker | G06F 9/3836 712/217 |
| 5,778,255 A | 7/1998 | Clark et al. | |
| 5,870,582 A * | 2/1999 | Cheong | G06F 9/3836 712/218 |
| 5,870,612 A | 2/1999 | Cheong et al. | |
| 6,813,705 B2 | 11/2004 | Duesterwald et al. | |
| 7,089,374 B2 * | 8/2006 | Tremblay | G06F 9/467 711/130 |
| 7,254,699 B2 | 8/2007 | Shepherd | |
| 7,890,675 B2 | 2/2011 | Aranguren et al. | |
| 8,335,219 B2 | 12/2012 | Simmons et al. | |
| 2004/0177239 A1 * | 9/2004 | Clift | G06F 9/384 712/228 |
| 2008/0288819 A1 | 11/2008 | Heller, Jr. | |
| 2011/0167247 A1 * | 7/2011 | Gibbs | G06F 9/30054 712/240 |
| 2013/0042094 A1 | 2/2013 | Heller, Jr. | |
| 2013/0046937 A1 * | 2/2013 | Heller, Jr. | G06F 9/466 711/123 |
| 2013/0205052 A1 | 8/2013 | Eyraud et al. | |
| 2014/0059333 A1 * | 2/2014 | Dixon | G06F 9/3004 712/244 |
| 2015/0169362 A1 * | 6/2015 | Gottschlich | G06F 9/467 711/147 |
| 2015/0205721 A1 * | 7/2015 | Diestelhorst | G06F 12/0811 711/122 |
| 2016/0154648 A1 * | 6/2016 | Dixon | G06F 9/3004 712/205 |

OTHER PUBLICATIONS

Alexander et al., "Distributed prefetchbuffer/cache design for high performance memory systems," Second International Symposium on High-Performance Computer Architecture, Feb. 1996, pp. 254-263.

Anonymously; "A novel squash & recovery mechanism in transactional memory system"; An IP.com Prior Art Database Technical Disclosure; http://ip.com/IPCOM/000196579; Jun. 7, 2010, pp. 1-2.

IBM et al.; "Processor Performance Monitoring with Depiction of the Efficiency of Bus Utilization and Memory Accesses of Superscalar Microprocessor"; An IP.com Prior Art Database Technical Disclosure; http://ip.com/IPCOM/000118371; Apr. 1, 2005, pp. 67-70.

* cited by examiner

METHOD AND APPARATUS FOR MANAGING A SPECULATIVE TRANSACTION IN A PROCESSING UNIT

FIELD

The present invention generally relates to data processing systems, and more specifically, to managing a speculative transaction in a processing unit.

BACKGROUND

High performance processors currently used in data processing systems today may be capable of "superscalar" operation and may have "pipelined" elements. Such processors typically have multiple elements which operate in parallel to process multiple instructions in a single processing cycle. Pipelining involves processing instructions in stages, so that the pipelined stages may process a number of instructions concurrently.

In a typical first stage, referred to as an "instruction fetch" stage, an instruction is fetched from memory. Then, in a "decode" stage, the instruction is decoded into different control bits, which in general designate i) a type of functional unit (e.g., execution unit) for performing the operation specified by the instruction, ii) source operands for the operation and iii) destinations for results of operations. Next, in a "dispatch" stage, the decoded instruction is dispatched to an issue queue (ISQ) where instructions wait for data and an available execution unit. Next, in the "issue" stage, an instruction in the issue queue is issued to a unit having an execution stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there are buffers to hold execution results before results are deposited into the destination register, and buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the above described processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. An instruction for which an assumption has been made is generally referred to as an "interruptible instruction", and the determination that an assumption is incorrect, triggering the need for the processor state to recover to a prior state, is referred to as an "interruption" or an "interrupt point". In addition to incorrect assumptions, there are other causes of such interruptions requiring recovery of the processor state. Such an interruption is generally caused by an unusual condition arising in connection with instruction execution, error, or signal external to the processor.

In speculative parallelization systems, also known as thread-level speculation (TLS) or multi-scalar systems, a compiler, runtime system, or programmer may divide the execution of a program among multiple threads, i.e. separately managed sequences of instructions that may execute in parallel with other sequences of instructions (or "threads"), with the expectation that those threads will usually be independent, meaning that no thread will write data that other threads are reading or writing concurrently. Due to the difficulty in statically determining the memory locations that will be accessed by threads at compilation time, this expectation is not always met. The parallel threads may actually make conflicting data accesses. Such parallelization systems use speculative execution to attempt to execute such threads in parallel. It is the responsibility of the system to detect when two speculative threads make conflicting data accesses, and recover from such a mis-speculation.

Each parallel thread corresponds to a segment of the original sequential code, and the parallel threads are therefore ordered with respect to one another according to their sequence in the sequential version of code. It is the responsibility of the system to ensure that the results of a speculative thread are not committed until all prior speculative threads in this sequence are known to be free of conflicts with the committing thread. Once it has been determined that the thread does not conflict with any threads in the prior sequence, and prior threads have committed, that thread may commit.

Systems that support transactional memory typically include a subset of the requirements of a system that supports speculative parallelization. Transactional memory attempts to simplify concurrent or parallel programming by allowing a group of load and store instructions to execute in an atomic manner, i.e. it is guaranteed that either (1) all instructions of the transaction complete successfully or (2) no effects of the instructions of the transactions occur, i.e. the transaction is aborted and any changes made by the execution of the instructions in the transaction are rolled-back. In this way, with atomic transactions, the instructions of the transaction appear to occur all at once in a single instant between invocation and results being generated.

Hardware transactional memory systems may have modifications to the processors, caches, and bus protocols to support transactions or transaction blocks, i.e. groups of instructions that are to be executed atomically as one unit. Software transactional memory provides transactional memory semantics in a software runtime library with minimal hardware support.

Transactional memory systems seek high performance by speculatively executing transactions concurrently and only committing transactions that are non-conflicting. A conflict occurs when two or more concurrent transactions access the same piece of data, e.g. a word, block, object, etc., and at least one access is a write. Transactional memory systems may resolve some conflicts by stalling or aborting one or more transactions.

Transactional blocks are typically demarcated in a program with special transaction begin and end annotations. Transactional blocks may be uniquely identified by a static identifier, e.g., the address of the first instruction in the transactional block. Dynamically, multiple threads can concurrently enter a transactional block, although that transactional block will still share the same static identifier.

SUMMARY

Certain aspects of the present disclosure provide a method for writing data into a register entry of a processing unit. The method generally includes initiating the speculative transaction by dispatching a first instruction indicating start of the speculative transaction; marking one or more register file (RF) entries as pre-transaction memory (PTM), in response to the initiating; dispatching at least one second instruction targeting at least one of the marked RF entries, while the transaction is active, the at least one second instruction writing new result data into the at least one RF entry; saving previous result data evicted from the at least one RF entry by the new result data, into a history buffer (HB) entry; and marking the HB entry as PTM, in response to the saving, wherein the processing unit, upon detecting a trigger, is configured to rollback to a state before the initiating the transaction by restoring the previous result data to the at least one RF entry.

Certain aspects of the present disclosure provide an apparatus for managing a speculative transaction in a processing unit. The apparatus generally includes means for initiating the speculative transaction by dispatching a first instruction indicating start of the speculative transaction; means for marking one or more register file (RF) entries as pre-transaction memory (PTM), in response to the initiating; means for dispatching at least one second instruction targeting at least one of the marked RF entries, while the transaction is active, the at least one second instruction writing new result data into the at least one RF entry; means for saving previous result data evicted from the at least one RF entry by the new result data, into a history buffer (HB) entry; means for marking the HB entry as PTM, in response to the saving; and means for, upon detecting a trigger, rolling back the processing unit to a state before the initiating the transaction by restoring the previous result data to the at least one RF entry.

Certain aspects of the present disclosure provide a computer program product for managing a speculative transaction in a processing unit. The computer program product generally comprising a computer-readable storage medium having computer-readable program code embodied therewith for performing method steps. The method steps generally include initiating the speculative transaction by dispatching a first instruction indicating start of the speculative transaction; marking one or more register file (RF) entries as pre-transaction memory (PTM), in response to the initiating; dispatching at least one second instruction targeting at least one of the marked RF entries, while the transaction is active, the at least one second instruction writing new result data into the at least one RF entry; saving previous result data evicted from the at least one RF entry by the new result data, into a history buffer (HB) entry; and marking the HB entry as PTM, in response to the saving, wherein the processing unit, upon detecting a trigger, is configured to rollback to a state before the initiating the transaction by restoring the previous result data to the at least one RF entry.

DETAILED DESCRIPTION

To clearly point out novel features of the present invention, the following discussion omits or only briefly describes conventional features of information processing systems which are apparent to those skilled in the art. It is assumed that those skilled in the art are familiar with the general architecture of processors, and in particular with processors which operate in an in-order dispatch, out-of-order execution, in-order completion fashion. It may be noted that a numbered element is numbered according to the figure in which the element is introduced, and is referred to by that number throughout succeeding figures.

Figure 1:
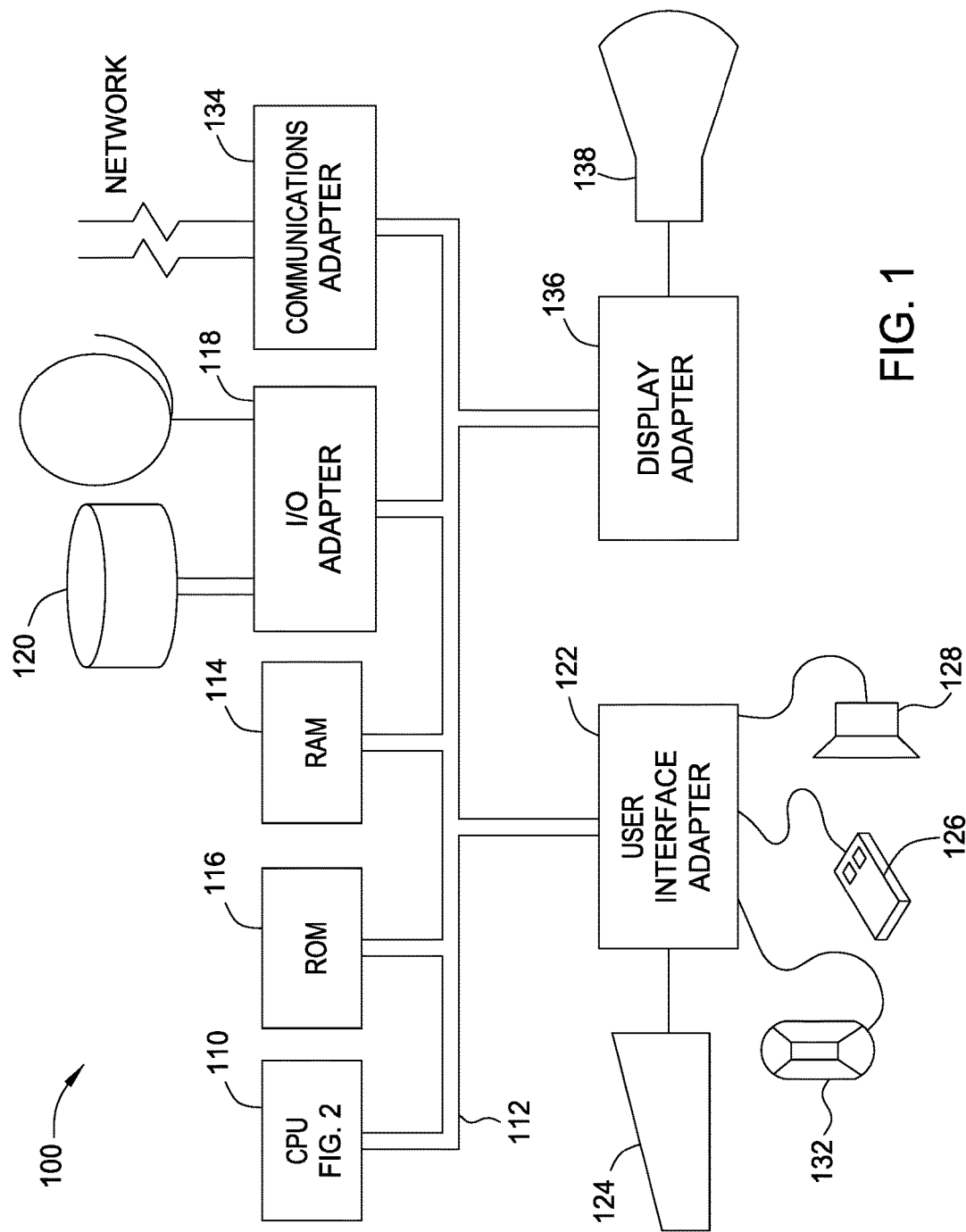
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110 such as a PowerPC microprocessor ("PowerPC" is a trademark of IBM Corporation). The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and operates according to reduced instruction set computing ("RISC") techniques. The CPU 110 processes according to processor cycles, synchronized, in some aspects, to an internal clock (not shown).

Figure 2:
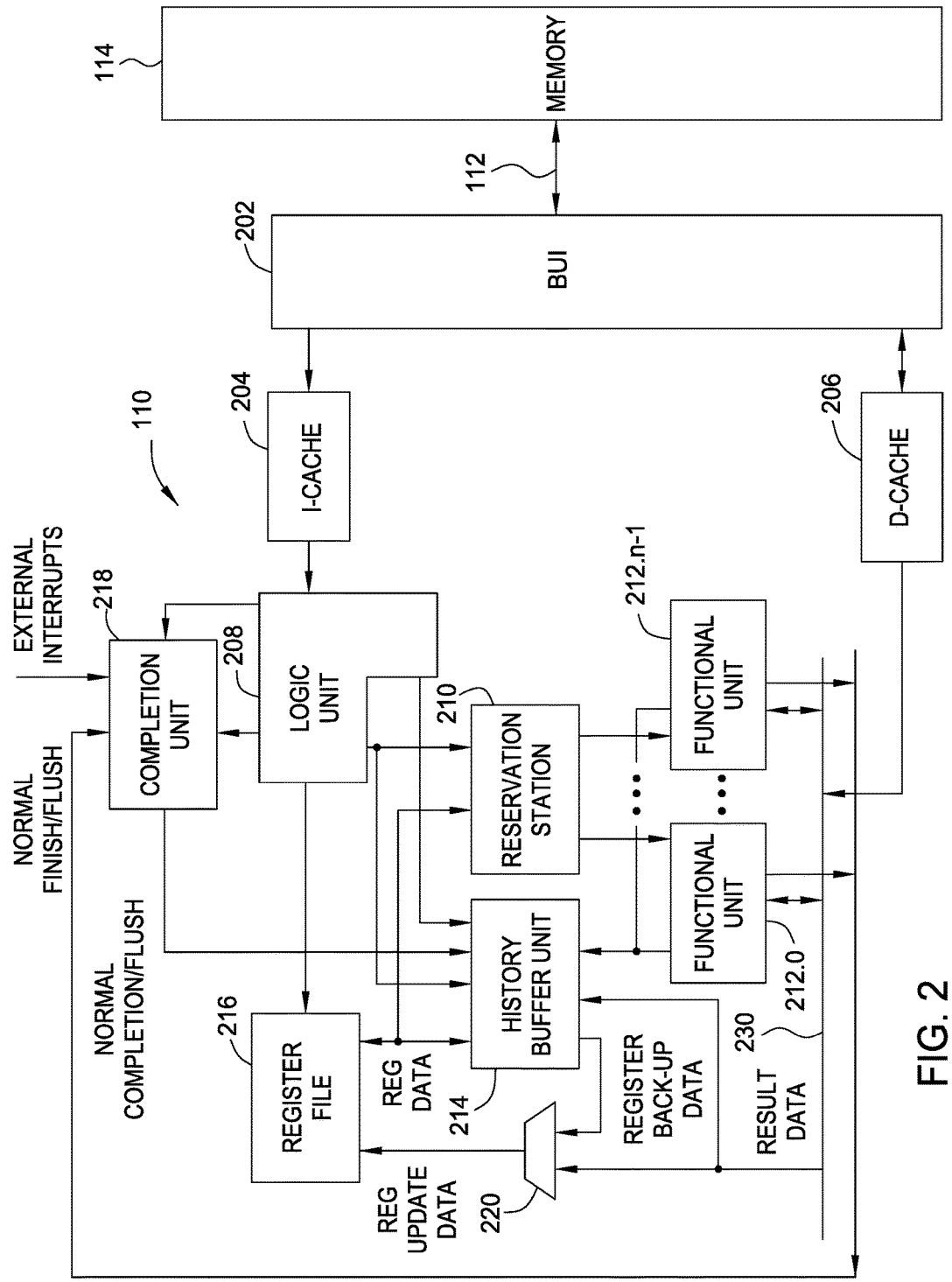
FIG. 2 illustrates a block diagram of a processor in which certain aspects of the present disclosure may be practiced.

FIG. 2 illustrates a block diagram of a processor 110 in which certain aspects of the present disclosure may be practiced. Processor 110 has a bus interface unit 202 coupled to the bus 112 for controlling transfers of data and instructions between memory, such as random access memory 114, and caches, e.g. instruction cache (I-Cache) 204 and data cache (D-Cache) 206.

Instructions may be processed in the processor 110 in a sequence of logical, pipelined stages. However, it should be understood that the functions of these stages, may be merged together, so that this particular division of stages should not be taken as a limitation, unless such a limitation is indicated in the claims herein. Indeed, some of the previously described stages are indicated as a single logic unit 208 in FIG. 2 for the sake of simplicity of understanding and because each distinction between stages is not necessarily central to the present invention.

Logic unit 208 in FIG. 2 includes fetch, branch processing, instruction buffer, decode and dispatch units. The unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by the branch processing unit. The logic unit 208 also decodes the instructions and dispatches them to an appropriate functional unit (e.g., execution unit) 212.0, 212.1, . . . 212.n−1 via reservation station 210. In executing the instructions, the units 212 input and output information to registers (shown collectively as register file 216). The functional units 212 signal the completion unit 218 upon execution of instructions and the completion unit 218 retires the instructions, which includes notifying history buffer (HB) logic 214. As will be explained in detail later, the history buffer (HB) may save a processor state before, for example, an interruptible instruction, so that if an interrupt occurs, HB control logic may recover the processor state to the interrupt point by restoring the content of registers. This use of a history buffer may have the advantage of reducing the timing penalty in register lookup during instruction dispatch as compared to a register renaming scheme. In an aspect, functional units 212 also assert results on one or more result buses (e.g. write back buses) 230 so that the results may be written by one or more write ports 220 to the registers in the register file 216. In addition to notifying the HB logic unit 214 about retired instructions, the completion unit 218 or logic unit 208 may also notify the HB unit 214 about exception conditions and mispredicted branches for which instructions should be discarded prior to completion and for which the HB unit 214 should recover a state of the processor 110 as will be further described below. The HB logic unit 214 may also receive other information about dispatched instructions from the logic unit 208, the register file 216, and one or more functional units 212, relevant aspects of which will be described below.

In certain aspects, a CPU 110 may have multiple execution/processing slices with each slice having one or more of the units shown in FIG. 2. For example, each processing slice may have its own logic unit 208, register file 216, history buffer 214, reservation station 210 and functional/execution units 212. A CPU 110 having the multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Each processing slice may be an independent processor (e.g., processor 110) and may execute instructions independently of other processing slices in the multi-slice processor.

Figure 3:
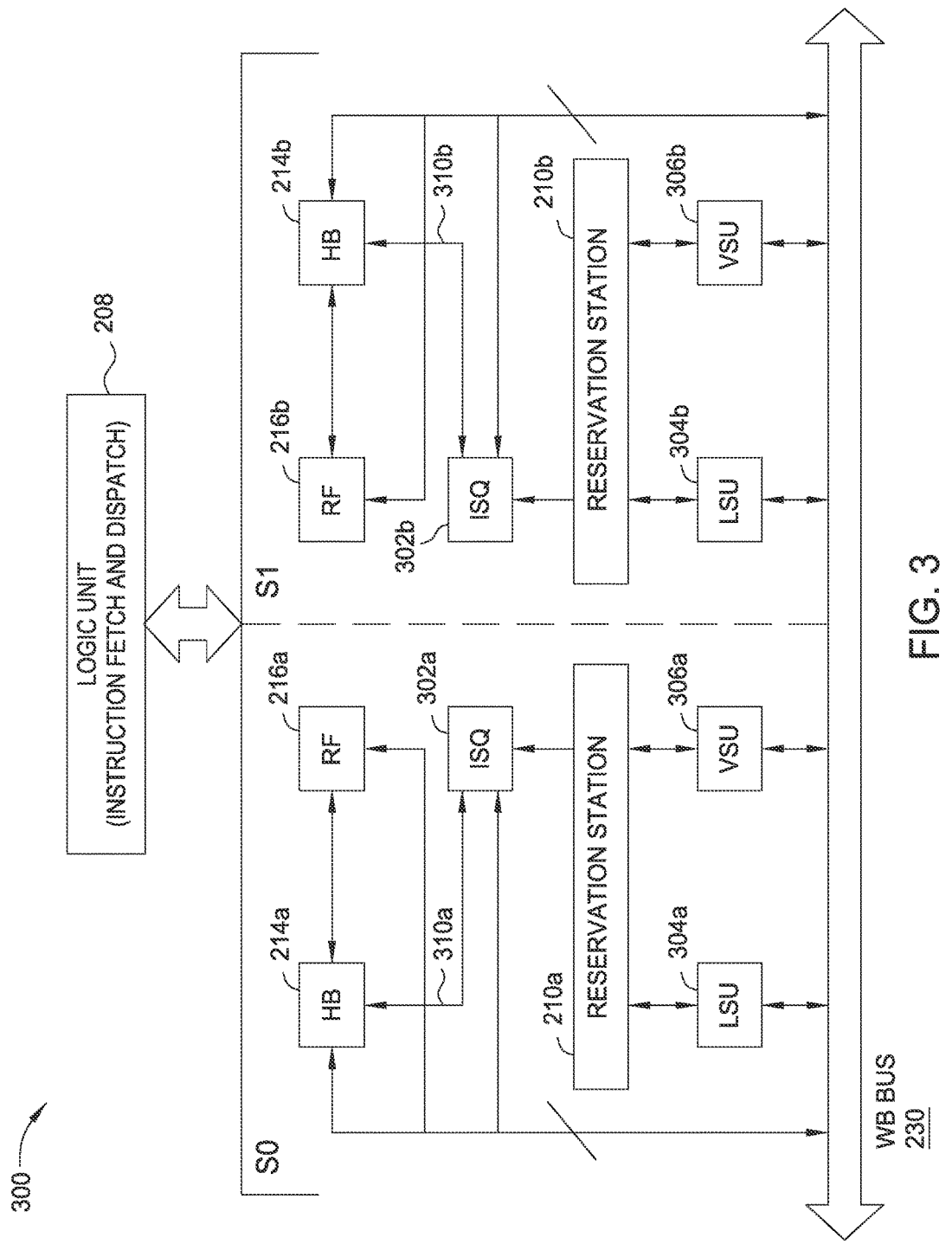
FIG. 3 illustrates a multi-slice processor in accordance with certain aspects of the present disclosure.

FIG. 3 illustrates a multi-slice processor 300 in accordance with certain aspects of the present disclosure. It may be noted that FIG. 3 only shows portions/components of the multi-slice processor 300 that are relevant for this discussion. As shown in FIG. 3, the multi-slice processor 300 includes two processing slices Slice 0 and Slice 1. Each of the Slices 0 and 1 includes an issue queue (ISQ) (302a and 302b), a reservation station (210a and 210b), execution units including a load store unit (LSU) (304a and 304b), a vector scalar unit (VSU) (306a and 306b), a register file (RF) (216a and 216b), and a history buffer (HB) (214a and 214b). As shown, logic unit 208 may perform instruction fetch and dispatch for the multi-slice processor. In an aspect, the slices 0 and 1 may share one register file 216 having an array of general purpose registers (GPRs). In an aspect, the reservation station includes a bank of register entries. In certain aspects, the ISQ 302 holds a set of instructions and the reservation station accumulates data for the instruction inputs. When an instruction is dispatched, the ISQ 302 may allocate an RF entry for the instruction. The source RF entries required as input for the instruction are looked up and passed on to the reservation station. When all source data accumulates for the instruction, the reservation station passes it on to one or more execution units designated for execution of the instruction. In an aspect, the reservation station is part of the ISQ 302. Each of the LSUs 304 and VSUs 306 may make result data available on the write back buses 230 for writing into an RF entry or HB entry. In an aspect each of the LSUs 304 and VSUs 306 may have a corresponding WB bus 230.

It may be noted that the two slices are shown for ease of illustration and discussion only, and that multi-slice processor 300 may include more than two slices with each slice having all the components discussed above for each of the slices 0 and 1. Further, the processing slices may be grouped into super slices (SS), with each super slice including a pair of processing slices. For example, a multi-slice processor may include two super slices SS0 and SS1, with SS0 including slices 0 and 1, and SS1 including slices 2 and 3. In an aspect, one register file 216 may be allocated per super slice and shared by the processing slices of the super slice.

In certain aspects, the slices 0 and 1 of the multi-slice processor 300 may be configured to simultaneously execute independent threads (e.g., one thread per slice) in a simultaneous multi-threading mode (SMT). Thus, multiple threads may be simultaneously executed by the multi-slice processor 300. In an aspect, a super slice may act as a thread boundary. For example, in a multi thread mode, threads T0 and T1 may execute in SS0 and threads T2 and T3 may execute in SS1. Further, in a single thread (ST) mode, instructions associated with a single thread may be executed simultaneously by the multiple processing slices of at least one super slice, for example, one instruction per slice simultaneously in one processing cycle. The simultaneous processing in the multiple slices may considerably increase processing speed of the multi-slice processor 300.

In certain aspects, each register file (or GPR array) 216 may include a number of RF entries or storage locations (e.g., 32 or 64 RF entries), each RF entry storing a 64 bit double word and control bits. In an aspect, the RF entry may store 128 bit data. In an aspect, a register file is accessed and indexed by logical register (LREG) identifiers, for example, r0, r1, ..., rn. Each RF entry holds the most recent (or youngest) target result data corresponding to an LREG for providing the result data to a next operation. In an aspect, a new dispatch target replaces a current RF entry. The current RF entry may be moved to the history buffer 214. An RF entry is generally written at dispatch of new target and read at dispatch of source. Further, an RF entry may be updated at write back, restoration (flush), or completion.

As noted above, the history buffer (HB) 214 may save a processor state before, for example, an interruptible instruction, so that if an interrupt occurs, HB control logic may recover the processor state to the interrupt point by restoring the content of registers. In an aspect, HB 214 stores old contents of RF entries when new targets are dispatched targeting the RF entries. In certain aspects, each HB instance 214, may include 48 HB entries, each HB entry including 64 bits (or 128 bits) of data (e.g., matching the length of an RF entry) and control bits.

According to the terminology used herein, when an instruction performs an operation affecting the contents of a register, the operation is said to "target" that register, the instruction may be referred to as a "targeting instruction", and the register may be referred to as a "target register" or a "targeted register". For example, the instruction "ld r3, . . . " targets register r3, and r3 is the target register for the instruction "ld r3, . . . ".

Figure 4:
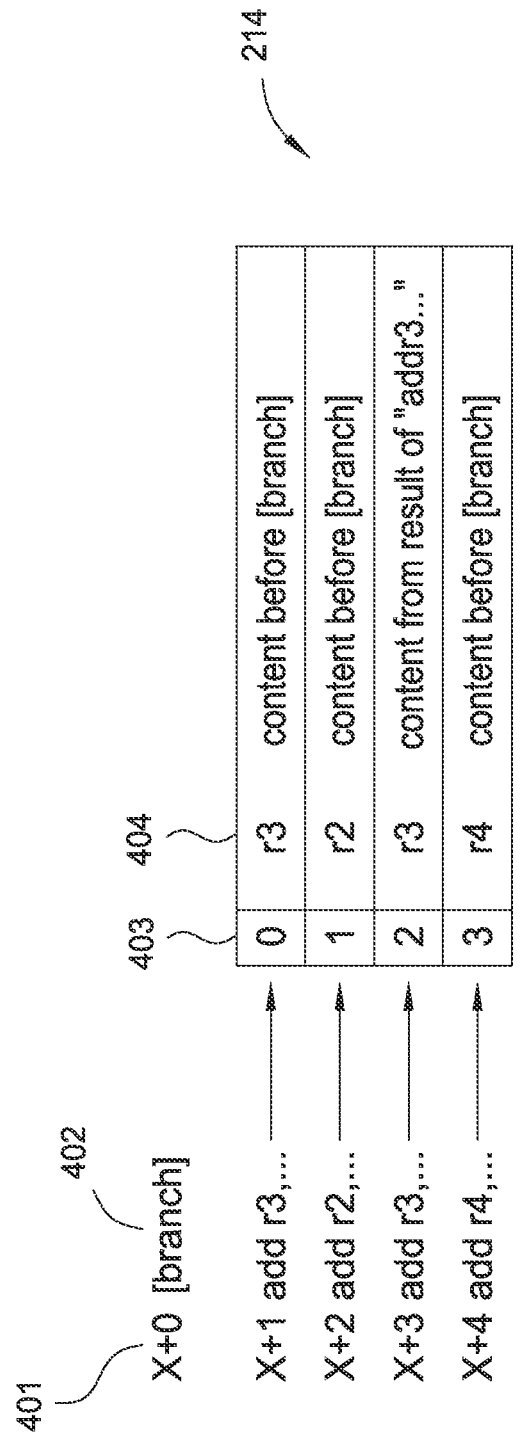
FIG. 4 illustrates an example history buffer as applied to the processing of instructions, in accordance with certain aspects of the present disclosure.

FIG. 4 illustrates an example showing a history buffer 214 as applied to the processing of representative instructions 402 shown. The instructions 402 may reside in a memory device (e.g., memory 114) in a sequence of lines 401 which are depicted in FIG. 4 as line numbers X+0, X+1, etc. The instruction 402 at line X+0 is depicted as "[branch]", signifying that the instruction is representative of a conditional branch type instruction, such as "branch target—addr", for example. The instruction 402 at line X+1 is depicted as "add, r3 . . . ", signifying that the instruction is representative of an instruction such as "add r3, r6, r7" (i.e., r6+r7→r3), for example, which alters the content of register r3.

In certain aspects, upon speculative prediction that the branch type instruction at line X+0 is not taken, instruction "add r3, . . . ", at line X+1, may be dispatched and the value of target register r3 before the branch instruction at X+0 may be saved in a history buffer entry ("HBE") 404. Herein, a history buffer entry may be referred to by its entry number 403. That is, a first entry 404 in a history buffer is referred to as HBE0, a second entry as HBE1, etc. Instructions "add r2, . . . ", "ld r3, . . . ", and "add r4, . . . " may result in history buffer entries HBE1, HBE2, and HBE3 respectively. Notice that HBE2 has the contents of register r3 produced by instruction "add r3, . . . ", because "ld r3, . . . " is dispatched after "add 3, . . . ". There is no instruction dispatched with target r4 except "add r4 . . . "; therefore, HBE3 has the content of r4 produced before the branch.

In certain aspects, if the prediction that the branch at line X+0 is not taken proves to be correct, and the instruction "ld r3, . . . " at line X+1 in this context causes no exception, then the HB 100 entries HBE0, HBE1, etc. may be deallocated in the order of completion. But, if the instruction "ld r3, . . . " causes an exception, the recovery mechanism may restore register content for r3 and r4 from HBE2 and HBE3, and deallocate those HB entries. The processor will thus be restored to the state immediately before the "ld r3, . . . " instruction was dispatched. The state at that point includes register r3 with contents produced by "add r3, . . . ", and the content of r4 before the branch (which is the same as its content before the "ld r3, . . . " instruction).

If the prediction that the branch is not taken proves to be incorrect, then results must be abandoned for the results that were produced by speculatively executing instructions after the branch instruction. The registers written by these instructions need to be restored to their contents prior to the branch instruction. For example, if the branch is resolved after writing into HBE 3, the recovery mechanism may copy register content in HBE0, HBE1 and HBE3 back to registers r3, r2 and r4 in order to recover the processor state that existed before the branch. Also, in connection with completing the recovery, all four HBE's may be deallocated.

In certain aspects in addition to interruptions arising from speculative execution of instruction, an interruption may also be caused by an unusual condition arising in connection with instruction execution, error, or signal external to the processor 110. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 114 or disk 120, 6) attempting to access storage, including RAM 114 or disk 120, with an invalid effective address alignment, or 7) a System Reset or Machine Check signal from a device (not shown) directly connected to the processor 110 or another device in the system 100 connected to the processor 110 via the bus 112.

In many cases, such as in the above example, it is problematic to implement the mechanism of FIG. 4 because the HB 100 may contain multiple values of a given register. For example, as shown in FIG. 1 the HB 100 has values of r3 in HBE0 and HBE2. The HB 100 contains both these values because in different contexts either value of r3 may need to be recovered. In an aspect, all valid entries in the RF 216 may be marked when any new interruptible instruction is dispatched. Once an RF entry is marked, whatever was in the RF now represents the "old" value. However, content of the marked RF entries remain in the RF as long as they contain the youngest data. For example, if register r5 is not written after a branch, the "old" r5 checkpoint value is still the youngest value and still resides in the RF. Thus r5 does not need to be restored in the case of a mispredict on that branch. In an aspect, only the first time an RF entry is targeted at or after a checkpoint, the old value is copied from the RF to the HB. Additional writes to that target RF entry (e.g., younger result data) may remain in the RF and may not touch that old restore value in the HB. In other words, there may be one checkpoint value per register per interruptible point. However multiple interruptible points may be present, and therefore, multiple restore values for a given RF entry may be expected to be stored in the HB.

Therefore, the need exists to select between multiple values of a RF entry from the HB 214, in recovering the processor state. One possible solution is to exhaustively reverse the order of speculative execution back to the interrupted instruction. This way, if recovery is required all the way back to line X+0, for example, the r3 content from HBE 0 will overwrite the content from HBE2, and the processor will have recovered back to the known state before the branch at x+0.

However, a disadvantage of this mechanism is that the processor is stalled for a number of cycles while this iterative process recovers the processor state. Because branch misprediction may occur frequently, the multi-cycle stall penalty may not be acceptable in a high performance processor. If, in spite of this limitation, a history buffer is used for recovering a processor state, a need exists for improving the efficiency of recovering the processor state from information stored in the history buffer, including improving the history buffer multi-cycle stall penalty.

In certain aspects, in case of a multi-slice architecture shown in FIG. 3, each instruction may be dispatched to any of the processing slices (e.g., slices S0 or S1), for example, in a single thread mode when both slices of a super slice are executing a single thread. Since source data for executing an instruction must be available in the register file of the processing slice executing the instruction, each register file 216 of each processing slice must have the exact same state (i.e., in sync) after execution of each instruction in one of the processing slices. In other words, each of the register files 216 must be identical. For example, instruction 402 at line X+1 targeting register r3 may be dispatched to slice S0, and instruction 402 at line X+2 targeting register r2 may be dispatched to slice S1. Now, if the add operation at line X+2 is r3+r5→r2, this instruction must read the content of r3 written by the previous add instruction at line X+1. If the result data of the instruction at line X+1 is written only in the RF 216a of slice S0, this result data will not be available in RF 216b of slice S1 for reading by the instruction at line X+2 for execution in slice S1. Thus, result data for each executed instruction must be written into every corresponding RF entry of all the processing slices executing a thread. And thus, all register files 216 within the same thread have to look at all dispatches to that thread. In an aspect, each slice may determine the youngest target across the dispatch bus and write their own RF entries with the same, identical youngest data.

In certain aspects of the present disclosure, in a single thread mode, HBs 214 may be unique in each slice, and all HB instances 214 of a multi-slice processor 300 may be used in parallel across all execution slices to increase the total pool of HB entries available to that thread. So, unlike the register files 216, the HBs 214 of the processing slices need not be identical, and the single thread mode may take advantage of the multiple HBs 214 available to the multiple slices executing the single thread. For example, by having one HB per slice in a super slice, a thread (e.g., in a single thread mode) has twice as many HB entries available, allowing more instructions to be simultaneously executed. For example, the result of the instruction at line X+1 may write the previous content of r3 to HB 214a of slice S0. Further the instruction at line X+2 may write the previous content of r2 to HB 214b of slice S1. In an aspect, since the register files 216 must be identical, restoration of content from each HBE must write the HBE content to register files 216 of every processing slice being used to execute the thread. However, restoration of HBE content to the register files 216 of each processing slice based on existing mechanisms may lead to extensive amount of wiring to send from each HB 214 to the processing slices, which may not be feasible.

In certain aspects, unlike RF entries 216, HBEs 214 may not be identified by LREG identifiers, since the HBs may have multiple entries corresponding to each RF entry. In certain aspects, each instruction may be assigned a unique result tag (e.g., Instruction Tag, ITAG) associated with the target register at dispatch. When an instruction with target registers (e.g., RF entry) is dispatched, the result tag may be written into a tag field associated with the target register, and the prior target register content and the prior result tag may be retrieved from the RF entry and stored in a history buffer entry (HBE) allocated for it. In an aspect, the ITAG may uniquely identify each HBE corresponding to a register file entry.

Figure 5:
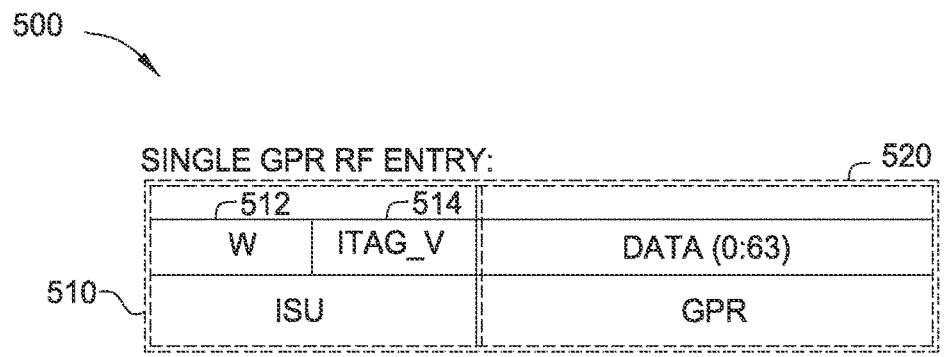
FIG. 5 illustrates contents associated with a General Purpose Register (GPR) Register File (RF) entry, in accordance with certain aspects of the present disclosure.

FIG. 5 illustrates contents associated with a GPR RF entry 500, in accordance with certain aspects of the present disclosure. FIG. 5 shows a split between data 520 held by the RF entry and control/status information 510 associated with the RF entry. In an aspect, the control/status bits 510 may be stored within the RF entry 500 or may be maintained separately as part of another unit of the processor 300 (e.g., ISU). As noted above, the RF entry 500 may store a double bit of 64 bits. The control/status information may include ITAG_V (including an ITAG value and Valid bit) 514 that identifies the instruction that wrote the data 520 in the RF entry 500. Valid (V) bit portion of the ITAG_V 514 indicates if the ITAG value is valid or not. In an aspect, an RF entry 500 is created when an instruction is dispatched. A unique ITAG is assigned to the instruction (e.g., by logic unit 208) and this ITAG is written into the created RF entry. Further, the V bit corresponding to the ITAG is set to 1. Result data 520 corresponding to the instruction, may be written into the created RF entry 500 via a write back procedure, as explained later. Written (W) bits 512, indicate whether data 520 is received from the write back buses 230 and available in the RF entry 500 or not. In an aspect, each W bit 512 corresponds to one write back bus. The pre transaction memory (PTM) bit indicates that data stored in the RF entry 500 is pre-transaction memory, i.e. older than a transaction memory instruction. In an aspect, the PTM bit may be marked as PTM by setting the PTM bit to one, upon initiation of a speculative instruction. Once the PTM bit is set to one, the current data stored in the RF entry 500 may be saved to a history buffer entry upon eviction by an instruction targeting the RF entry 500. In an aspect, the control/status bits 510 may include a producer bit (not shown) that indicates whether result data is delivered by one or more LSUs 304 or a VSU 306.

Figure 6:
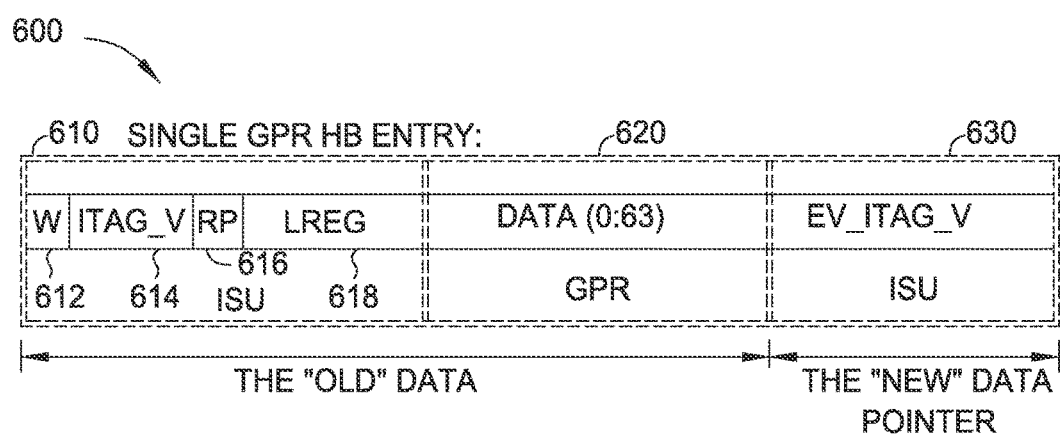
FIG. 6 illustrates contents associated with a history buffer entry (HBE), in accordance with certain aspects of the present disclosure.

FIG. 6 illustrates contents associated with a history buffer entry (HBE) 600, in accordance with certain aspects of the present disclosure. FIG. 6 shows a split between data 620

(old data of a corresponding RF entry 500) held by the HBE 600, control/status information 610 associated with the old data 620 stored in the HBE 600, and control/status information 630 associated with current data stored in the corresponding RF entry 500. In an aspect, the control/status bits 610 and 630 may be stored within the HBE 600 or may be maintained separately as part of another unit of the processor 300 (e.g., ISU). As noted above, the HBE 600 may store a double bit of 64 bits. The control/status information 610 may include ITAG_V (including an ITAG value and Valid bit) 614 that identifies an instruction to which data 620 corresponds to. Valid (V) bit portion of the ITAG_V 614 indicates if the ITAG value is valid or not. LREG 618 identifies a corresponding RF entry 500 to which data 620 is to be restored to, in the event of an exception or interruption. In an aspect, a HBE 600 may be created when an instruction is dispatched. A unique ITAG may be assigned to the instruction (e.g., by logic unit 208) and this ITAG may be written into the created HBE 600 as ITAG 614. Further, the V bit corresponding to the ITAG 614 may be set to 1. Result data 620 corresponding to the instruction, may be written into the HBE 600 from the RF entry 500. In an aspect, the HBE entry may be modified via an HB write back procedure, as explained later. Written (W) bits 612, indicate whether data 620 as received from the write back buses 230 is available in the HBE 600 or not. In an aspect, each W bit 612 corresponds to one write back bus. In an aspect, the control/status bits 610 may include a producer bit (not shown) that indicates whether result data is delivered by one or more LSUs 304 or a VSU 306. The PTM bit indicates whether the value currently stored in the HBE 600 is PTM or not. For example, the PTM bit may be marked PTM by setting to one, indicating that the value stored in the HBE 600 is pre-TM and must be restored if a transaction fails or upon a flush. The Restoration Pending (RP) bit 616 may be set to indicate that data 620 needs to be restored to the corresponding RF entry 500 indicated by the LREG 618 field, upon an exception or interruption.

In an aspect, control/status information 630 includes an evictor ITAG (EV_ITAG_V) identifying an instruction that evicted the current data 620 to the HBE 600 and stored a current data in the corresponding RF entry 500. The V bit of the EV_ITAG_V indicates if the EV_ITAG is valid or not.

In certain aspects, in case of RF write back, a VSU 306 may generate the entire 64 bit data at one time (e.g., in one cycle), which may be received on one of the write back buses 230 corresponding to the VSU 306, and written into the RF entry 500. However, multiple LSUs (e.g., 304a and 304b) may produce result data 520 for the single RF entry 500. Since LSUs 304 may need to retrieve the data 520 from memory (e.g., memory 114) for loading into the RF entry 300, all LSUs retrieving data 520 for the RF entry 500 may not be able to make their portion of the data 520 on their corresponding write back buses 230 at the same time. Each W bit 512 may keep track of the portion of the data 520 received from a corresponding LSU 304, and the W bit 512 may be set upon the corresponding portion of the data loaded into the RF entry 500. In an aspect, if the producer bit indicates a VSU result, then all the 4 W bits 512 may be set at the same time, as the entire data may be received on a WB bus 230 corresponding to a VSU306. In certain aspects, the above may apply to setting W bits upon HB write back.

As noted above, when an instruction is dispatched, the ISQ 302 may allocate an RF entry for the instruction, and the source RF entries required as input for the instruction are looked up and passed on to the reservation station 210. When all source data accumulates for the instruction, the reservation station 210 passes it on to one or more execution units (e.g, LSU 304 or VSU 306) designated for execution of the instruction. This mechanism of reading contents of source RF entries and passing them on to the reservation station 210 may be referred to as dispatching a source. In an aspect, dispatching a source may include reading data 520 and control/status information 510 of one or more source RF entries and passing on this information to the reservation station 210. In an aspect, if the W bits 512 of a source RF entry are all set to 1, the ISQ 302 will know that the source data is ready and available in the reservation station. The instruction is then ready and eligible to be issued to the execution unit On the other hand, if the one or more W bits are set to 0, the ISQ 302 will know that the source data is not available or partially available, and may monitor ITAG/V broadcasts on the write back buses 230 to update the source data field 520. In an aspect, W bits 512 set to 1 and ITAG_V bit set to 0 indicates the RF entry 500 is holding architected data, indicating that the corresponding instruction has been retired.

In certain aspects, dispatching a target includes overwriting a target RF entry 500 with target result data, in response to dispatching an instruction targeting the RF entry 500. As noted above, the content evicted out of the RF entry 500 as a result of the overwriting may be stored into an HBE 600, for example, if the instruction targeting the RF entry 500 is interruptible and is marked. In certain aspects, dispatching a target may include reading the current contents of the target RF entry 500 (data and control/status bits) and writing the current data and at least a portion of the current control/status bits to an HBE 600. For example, the ITAG corresponding to the current contents of the RF entry 500 may be copied to the HBE. Further, the ITAG V bit of the HBE 600 may be set to 1. In an aspect, the current data (or at least a portion thereof) from the RF entry 500 may be written into the HBE 600 via HB write back using the write back buses 230, as further explained below, and the W bits at the HBE may be set to 1 when the HB write back is complete. The target dispatch may further include overwriting the target RF entry 500 with new result data. This may include writing the ITAG value of the targeting instruction, setting the V bit to 1, and setting the W bits to 0 at the RF entry 500. The W bits at the RF entry 500 may be set to 1 when the new result data is written via the write back buse(s) 230, as further explained below. In an aspect, the ITAG of the targeting instruction may be saved as evictor ITAG in the corresponding HBE entry that stored the previous result data of the target RF entry 500.

Figure 7:
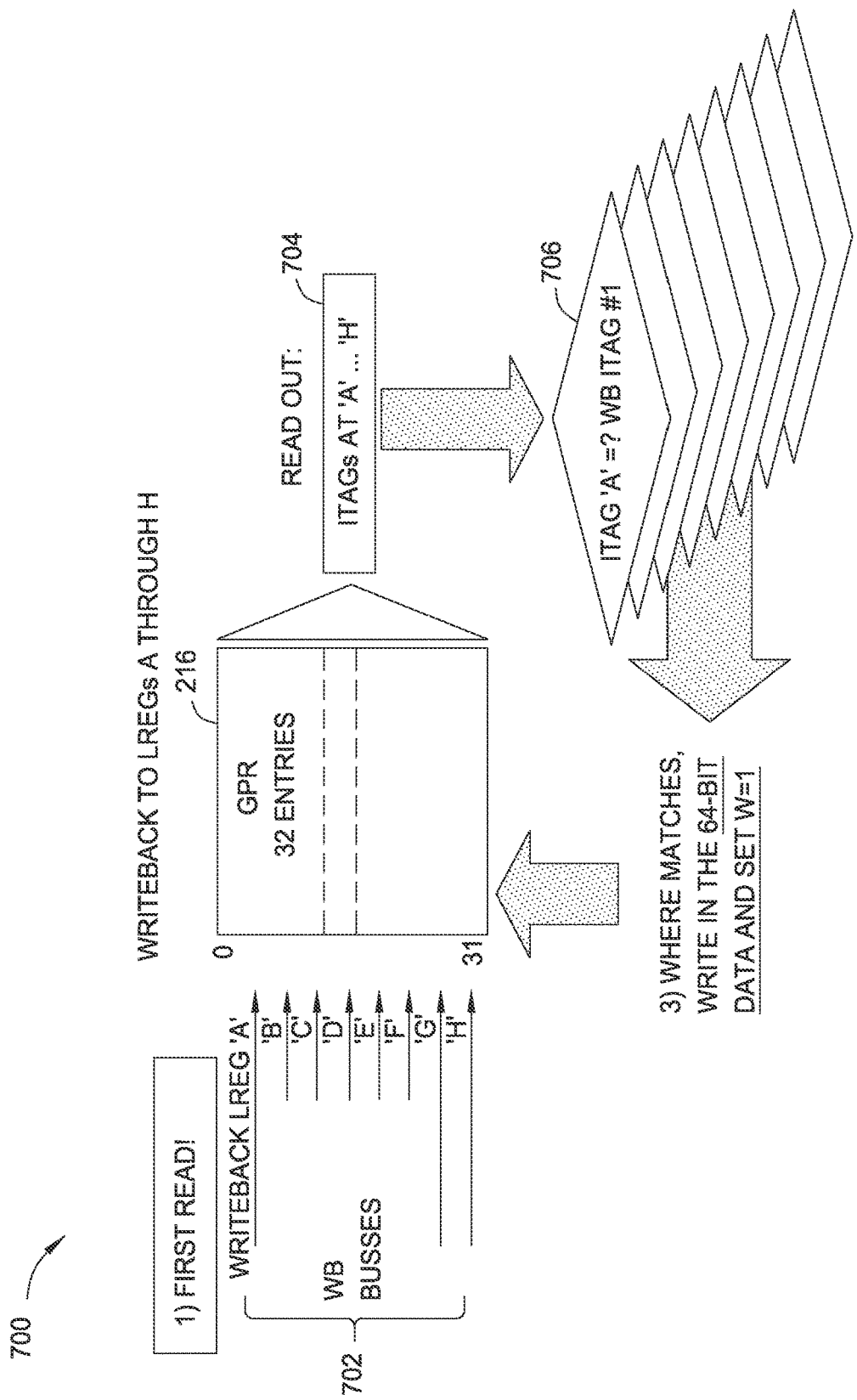
FIG. 7 illustrates RF write back procedure, in accordance with certain aspects of the present disclosure.

FIG. 7 illustrates RF write back procedure 700, in accordance with certain aspects of the present disclosure. The scenario considered in FIG. 7 is of a multi-slice processor having 8 processing slices (4 super slices) that can produce 8 individual results per cycle (e.g., in a single thread mode). Each of the eight write back buses 702 corresponds to an execution unit producing result data. In certain aspects, in addition to the result data, each write back bus 702 may carry the LREG identifier of the RF entry to be written with the result data. For example, the write back buses 702 carry result data for LREGs A-H. Each write back bus 702 may also carry the ITAG of the targeting instruction (not shown). For example, the write back buses 702 may carry write back WB ITAGs 1-8. In an aspect, the RF write back procedure 700 may include reading (at 704) ITAGs of each of the RF entries identified by LREGs A-H, and comparing (at 706) the read ITAG with each of the eight write back ITAGs, eight ITAG compares for each read RF entry ITAG. In an aspect, upon an RF entry ITAG matching with a write back ITAG, the result data from the WB bus is written in to the RF entry and a corresponding W bit is set. In an aspect, by including the LREG identifiers of the RF entries in the write back buses 702, ITAG compares may be performed only on a maximum of eight RF entries identified by the LREG identifiers, instead of comparing each WB ITAG with each of the 32 RF entries of the register file.

Figure 8:
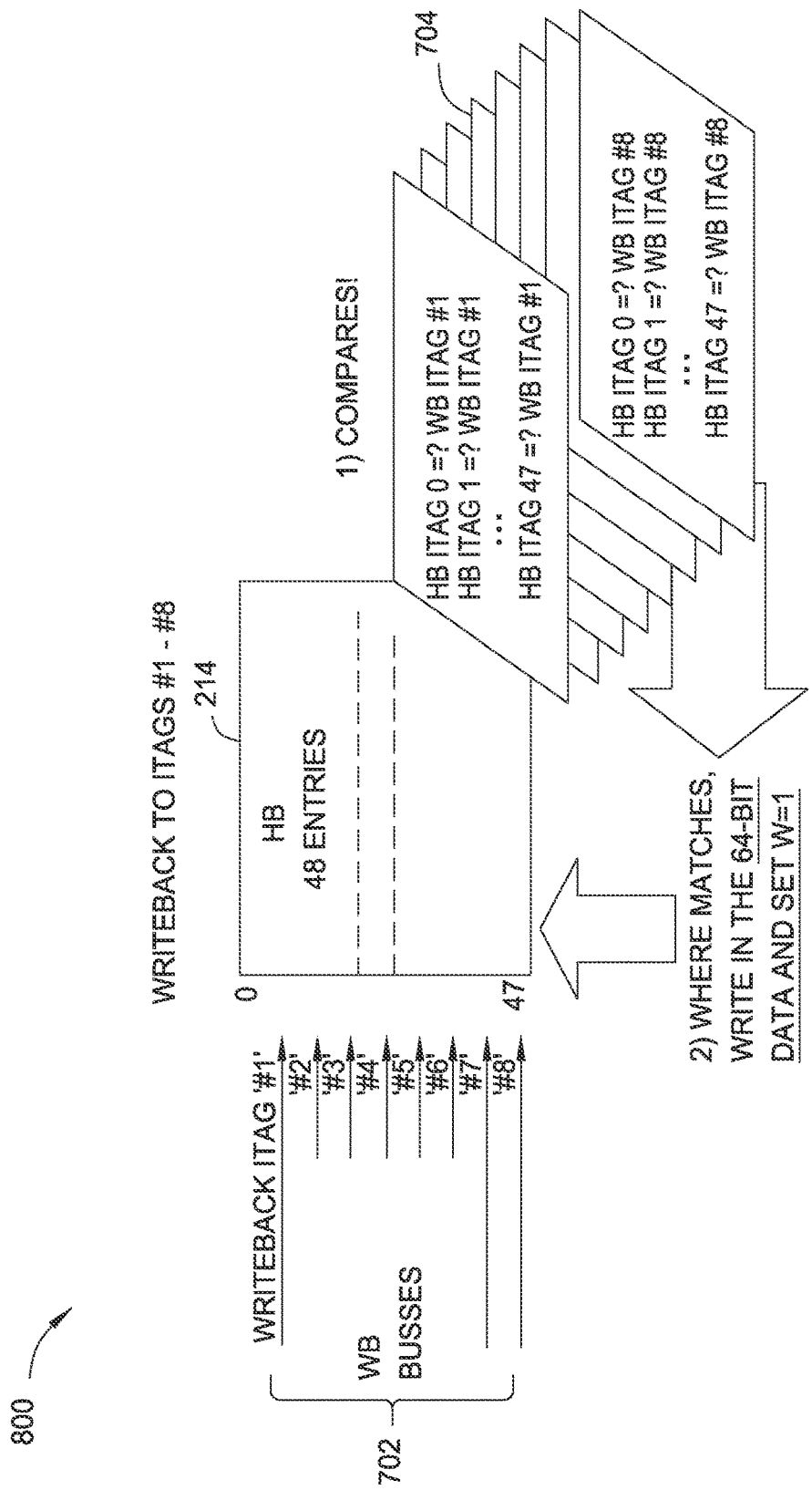
FIG. 8 illustrates a history buffer write back procedure, in accordance with certain aspects of the present disclosure.

FIG. 8 illustrates a history buffer write back procedure 800, in accordance with certain aspects of the present disclosure. As shown in FIG. 7 and discussed above, each of the eight write back buses 702 corresponds to an execution unit producing result data. However, unlike RF write back, carrying LREG identifiers on the WB buses may not be helpful to cut down the number of ITAG compares, since the HB instances of the multi-slice processor may (individually or collectively) carry multiple values corresponding to each RF entry. Thus, in an aspect the HB 214 may be indexed by ITAG compares. As shown in FIG. 8, each of the WB buses carries a WB ITAG (e.g., WB ITAGs 1-8). As shown at 704, as part of the HB write back 800, each HBE ITAG may be compared with each WB ITAG, and an HBE may be written with result data upon an ITAG match. Also, a corresponding W bit may be set to 1 upon writing result data into the HBE. In an aspect, none of the other control/status bits may change upon HB write back.

In certain aspects, processing a restore in a HB 214 may include marking all entries of the HB that need to be restored and moving them to the RFs 216. In an aspect, marking an HBE may include identifying the HBE for restoration based on an exception, interruption, etc. For example, the logic unit 208 may detect an exception or interruption, and may determine one or more HBEs for restoration to RFs by signaling the HB to perform a flush and restore operation. The logic unit 208 may send flush ITAG for the HBEs to the respective HB instances storing the result data to be restored. In an aspect, a HB logic unit within each HB may mark one or more HB entries based on the received flush ITAG information from the logic unit 208. In certain aspects, flush requires two different ITAG compares. A first ITAG compare may include comparing the HB entry ITAG to a flush ITAG. If the ITAG of an HB entry is lesser/equal to the flush ITAG, then it may be considered flushed and the Valid bit may be turned off. The second comparison may include comparing the evictor ITAG with the flush ITAG. Once the evictor ITAG is lesser/equal to the flush ITAG and the HB ITAG is older than the flush ITAG, then the HB will be marked for restore. The HB logic unit may then emulate issuing an instruction by sending, to the ISQ 302, the ITAG of an HBE and control/status bits along with the data to be restored. As shown in FIG. 3, restore data and control/status bits may be conveyed by the HBs 214a and 214b to the ISQs 302a and 302b via links 310a and 31b. The ISQs 302 may then issue an instruction based on the control/status bits received from the HB for loading the data into the RF entry via the execution units (e.g., LSUs 304) and the write back buses 230, as in case of a regular load instruction. In this way the already existing processor infrastructure and procedures may be used for the restoration, instead of designing extra circuitry for restoring content of each HBE to all RFs of a multi-slice processor. However, in an aspect, the RF must know the difference between a regular write back and a restore write back. As discussed above, in a regular write back, the RF compares its ITAG with the ITAG of the write back result bus, and writes the data if the ITAGs match. But, during the restore, the ITAG compare has to be bypassed and the RF entry must be written without an ITAG match. For example, as noted above, each HBE carries the LREG identifier of the target RF entry for restoration. This LREG identifier may be conveyed as part of the restore instruction dispatch, and may be carried by the write back buses 230. In an aspect, the restore data may be directly written in to the RF entry identified by the target LREG carried by the write back bus.

In certain aspects, when an instruction has finished executing, it may be considered completed and may be retired. Completion of an instruction indicates that there may be no further exceptions requiring restore, and the state of the processor (e.g., defined by one or more RF entries) becomes the architected state. Thus, in an architected state any older result corresponding to an RF entry stored in an HB instance is not needed. In an aspect, an HB entry needs to remain valid in the HB until its evictor completes, because there may be a flush point between the HB entry and the evictor in the RF, needing possible restore. Thus, until the evictor completes and the state of the evictor RF entry becomes the architected state, the previous HB entry needs to remain valid.

In certain aspects, completion requires two different ITAG compares. A first ITAG compare may include comparing the HB entry ITAG to a completion ITAG. If the ITAG of an HB entry is lesser/older than the completion ITAG, then it may be considered completed and the Valid bit may be turned off. But the Valid for the evictor remains set because an entry cannot be cleared until the evictor is also completed. The second comparison may include comparing the evictor ITAG with the completion ITAG. Once the evictor ITAG is lesser/older or equal to the completion ITAG, then the Valid bit for the evictor and the W bits may also be turned off. In certain aspects, the completion ITAG may be issued by the completion unit 218 upon a decision that an instruction corresponding to the ITAG is complete.

Figure 9:
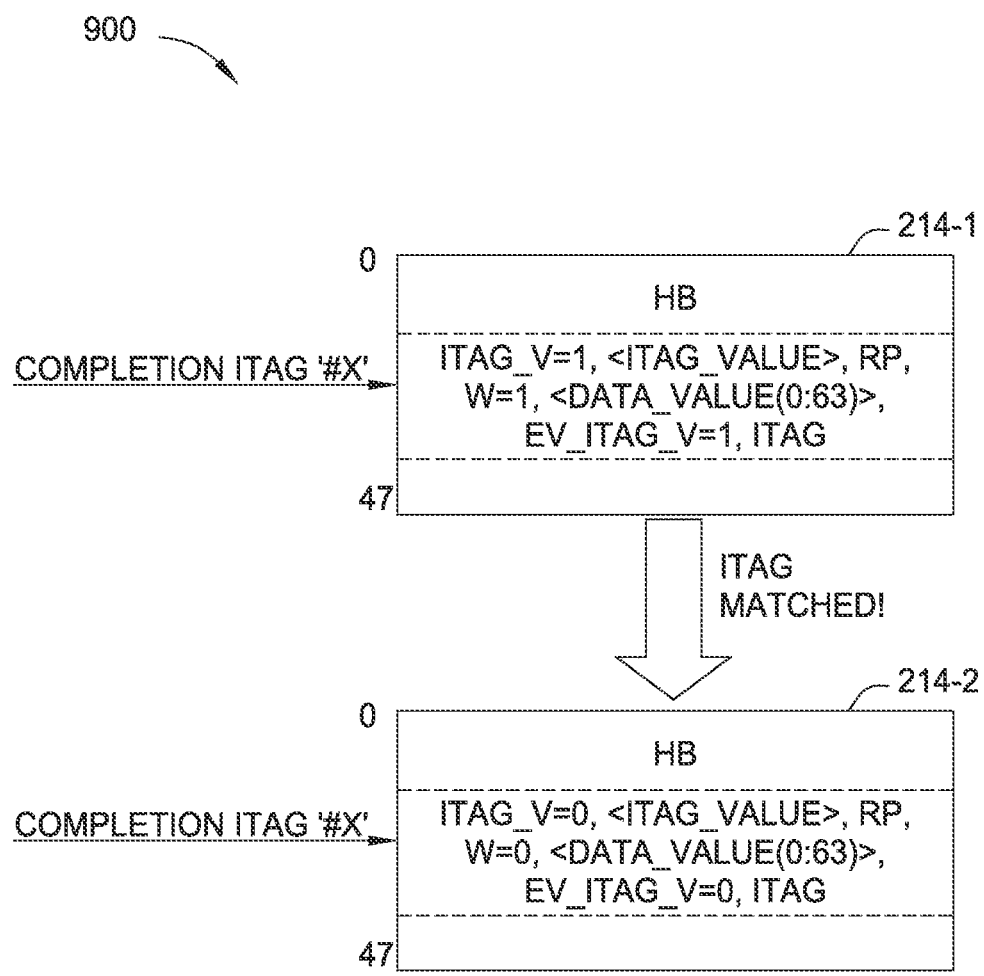
FIG. 9 illustrates completion of a HBE in accordance with certain aspects of the present disclosure.
Figure 11:
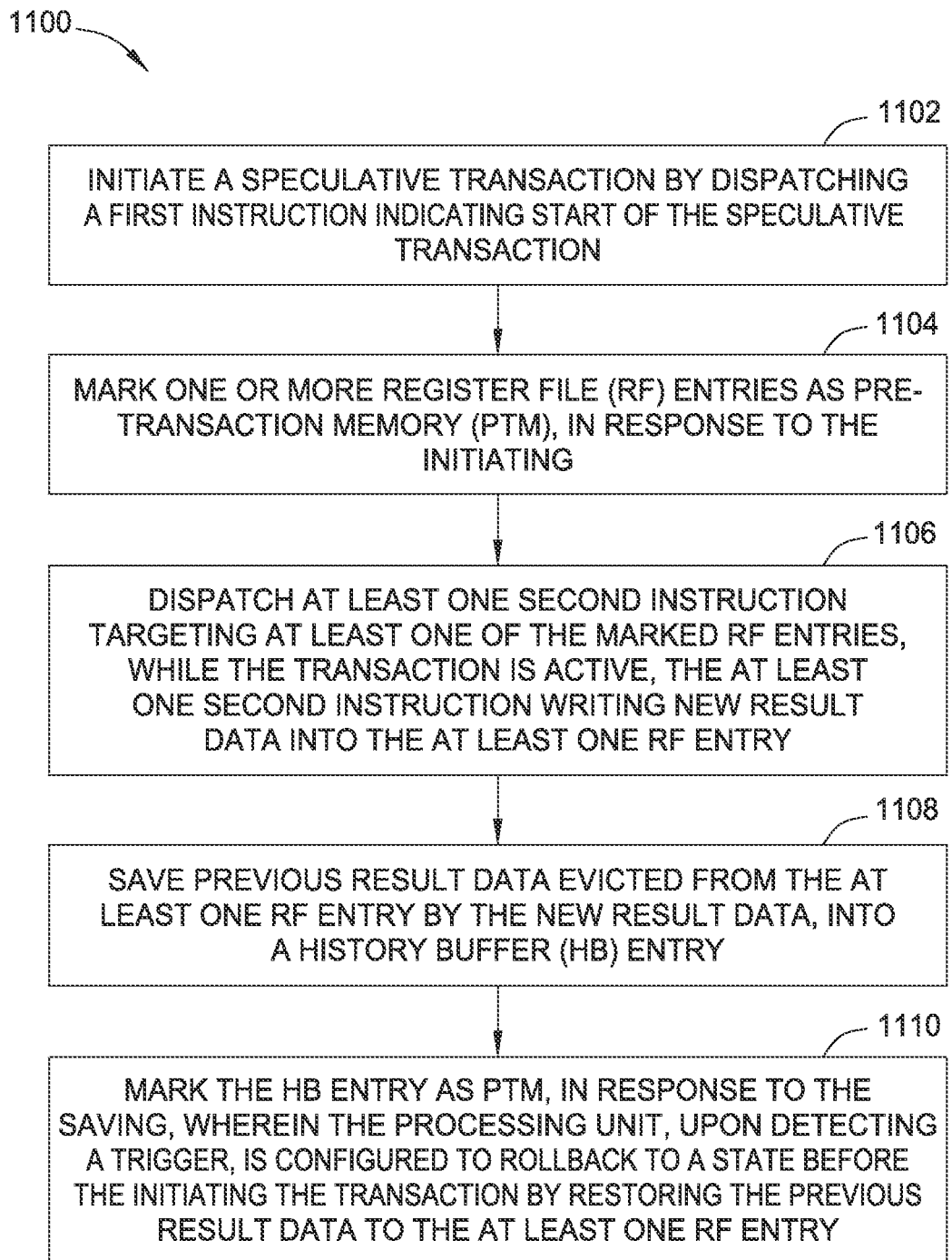
FIG. 11 illustrates operations for managing a speculative transaction in a processing unit, in accordance with certain aspects of the present disclosure.

FIG. 9 illustrates completion 900 of a HBE in accordance with certain aspects of the present disclosure. HBE 214_1 shows the control/status bits of the HBE before completion, and HBE 214_2 shows the control/status bits of the HBE after completion. As discussed above, completion includes comparing ITAG value and evictor ITAG value of the HBE 214 with the completion ITAG issued, for example, by the completion unit 218. If both the ITAG value and the evictor ITAG values are found older than the completion ITAG, the HBE entry is no longer needed as it is older than the architected state of the RF entry corresponding to the HBE 214. As the completed instruction is retired upon completion, the ITAG value corresponding to the instruction is no longer needed, and thus, as shown in FIG. 11, the valid bits of both ITAG and evictor ITAG are turned off (e.g., set to 0). In addition, the W bits are also turned off (e.g., set to 0) indicating that the HBE entry is not available for reading.

In certain aspects, when a microprocessor is executing a speculative Transactional Memory (TM) instruction, all pre-TM register states must be saved. When the TM instruction has successfully completed (i.e., passed), all these saved states may be discarded. However, if the speculative transaction fails, all pre-TM registers may be restored before execution may resume. In current processors, pre-TM states are generally saved into temporary storage before TM instructions may be dispatched. TM implemented in current processing systems has several limitations. For example, International Business Machine's POWER8 processor includes an Architected Mapper Cash (AMC) which is a subset of the RF of the processor and stores some of the architected states. In certain aspects, when an instruction completes (as discussed above), a corresponding architected register value may be stored in the AMC region of the RF.

However, the POWER8 processor does not have a single RF array that can store all in-flight (non-architected) values and all architected values corresponding to the RF. The POWER8 includes a separate software architected register (SAR) which holds the complete register architected state of the processor. Thus, every time a new instruction is dispatched targeting a particular RF entry, the system has to determine if the source data for the dispatched instruction is stored in the RF, the AMC, or the SAR, and retrieve the source data based on the determination. This architecture is cumbersome and power hungry.

Hence, there is a need to efficiently handle processing of a speculative transaction in a TM mode. Certain aspects of the present disclosure discuss techniques for handling speculative transaction by using the history buffer along with the register files of a processor. This way, the existing infrastructure may be used for implementing the TM mode without the need for separate storage devices, or cumbersome and power hungry circuits.

In certain aspects, a TM mode generally includes executing a speculative transaction corresponding to a single processing thread. A speculative transaction typically includes a sequential block of software codes. In an aspect, a transaction may be committed only if the transaction passes (e.g., does not conflict with other transactions corresponding to other threads). In certain aspects, a speculative transaction may be executed in a particular slice of a multi-slice processor 300. Also, two or more speculative transactions may be executed in parallel by two or more processing slices of the multi-slice processor, one transaction per slice. The transactions are speculative since the system does not know if the data generated by the transaction will actually result in an architected state or not. As noted above, if a transaction fails, the system may have to be restored back to the pre-TM state.

In certain aspects, pre-TM states (e.g. data values of registers evicted out by instructions in the TM mode) may be stored in the history buffers, and restored as and when required. In certain aspects, the TM mode may include speculative branch executions, rollbacks and completions within the transaction of the TM mode, yielding speculative architected states of one or more registers that are true at least until the TM mode is running (i.e., the transaction is active). However, the speculative architected states of the registers may be rolled back to pre-TM states once the TM mode is completed, e.g. TM mode fails or is aborted. Further, there may be one or more nested transactions within a transaction thread.

Figure 10:
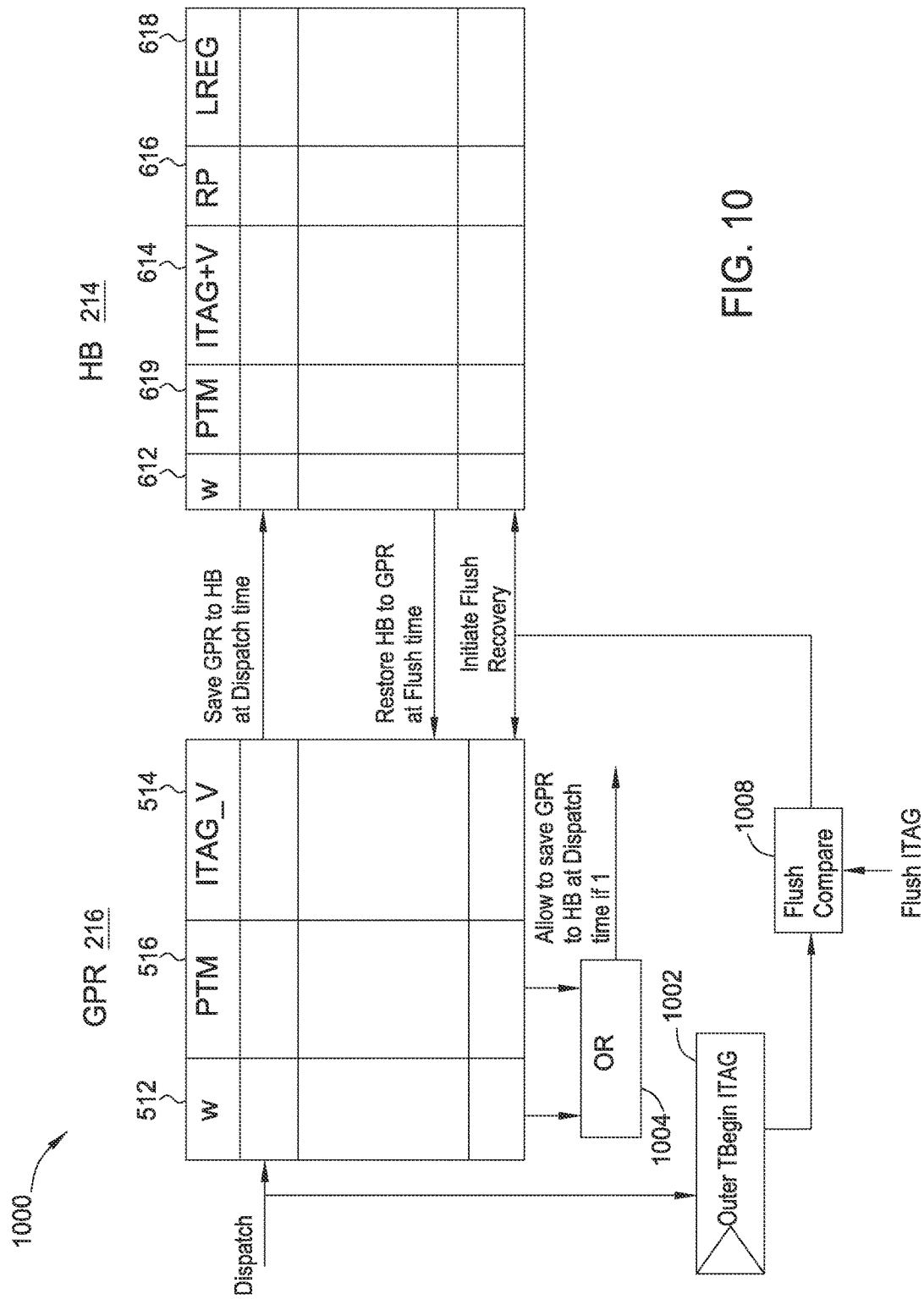
FIG. 10 is a logical illustration of a processing system used for transaction memory mode handling, in accordance with certain aspects of the present disclosure.

FIG. 10 is a logical illustration of a processing system 1000 used for TM mode handling, in accordance with certain aspects of the present disclosure. It may be noted that FIG. 10 only shows portions/components of the processing system 1000 that are relevant for this discussion. FIG. 10 shows a RF GPR 216 and a corresponding HB 214.

In certain aspects, the processing system 1000 may start a speculative transaction by dispatching an outer TBegin instruction, thus initiating a TM mode. As shown in FIG. 10, the ITAG corresponding to the outer TBegin instruction may be stored in a latch 1002 for later use in handling flushing of the outer TBegin instruction.

In certain aspects, when the outer TBegin instruction is dispatched PTM bits 516 of all RF entries in the GPR 216 are marked as pre-TM, for example, by setting the PTM bits 516 to one. As noted before, a PTM bit 516 of an RF entry set to one indicates that the RF entry includes pre-TM data and must be saved into the HB 214 upon eviction by an instruction targeting the RF entry in the TM mode. Thus, when in the TM mode, if an instruction targets to write a RF entry having its PTM bit 516 set to one, the pre-TM value of the RF entry is saved to an HB entry of the HB 214 upon eviction by new result data. In an aspect, as shown in FIG. 10, upon dispatching the targeting instruction, the W bit(s) and the PTM bit of the RF entry in the GPR 216 may be logically ORed (e.g., at 1004), and the pre-TM value of the RF entry may be saved into the HB 214 if the W bits are enabled (W bits set to 1) and the RF entry is marked as pre-TM (e.g., PTM bit set to one). Thus, the combination of the W bits and the PTM bit of the RF entry may be used as a read enable. The pre-TM value from the RF entry may be saved to the HB 214 via an HB write back procedure, as discussed above with reference to FIG. 8.

In certain aspects, once the pre-TM data of the RF entry is stored into the HB entry, the HB entry may also be marked pre-TM by setting its PTM bit 619 to one. A set PTM bit 619 of the HB entry indicates that the value stored in the HB entry is pre-TM. Further, any HB entry whose PTM bit 619 is set to one may not be de-allocated, even if it completes, at least while the transaction is active, for example, until the transaction is completely flushed out or the TM passes declaring the transactional state to be the correct state.

In certain aspects, when the TBegin instruction is dispatched, the PTM bits 619 for all HB entries may not be set, since the data already stored in the HB does not represent the youngest pre-TM state. In an aspect, after the TBegin is dispatched, the HB entries whose PTM bits 619 are not set to one may be allowed to complete and de-allocate normally.

In certain aspects, a register entry with its PTM bit 516 set to one may be written by a string of TM mode instructions, creating multiple HB entries storing previous result data evicted out from the register entry. In an aspect, the PTM bits 619 of the HB entries storing the subsequently evicted data from the RF entry may not be marked PTM (e.g., by setting PTM bit to 1). In an aspect, only the HB entry that holds the first pre-TM value evicted out of a register file after the TBegin was issued is marked PTM. Thus, all those subsequently evicted values in the HB 214 may be flushed or completed, and those entries may be cleared out as and when necessary. Thus, there may be flushes or completions within the TM mode, but the HB entries marked pre-TM may not be de-allocated until the transaction is pending (e.g., in execution).

In certain aspects the TBegin instruction may be flushed. In an aspect, during flush recovery, a flushing instruction ITAG is compared (e.g., at 1008) with the outer TBegin ITAG stored in the latch 1002 during the outer TBegin dispatch. In an aspect, if the flushing instruction ITAG is younger than the outer TBegin ITAG, then all registers are recovered normally to their pre-TM states, but the PTM bits are not reset. Alternatively, if the flushing ITAG is equal or older than the outer TBegin ITAG, then all registers are recovered normally to their pre-TM states and the PTM bits are reset to 0 after the flush recovery. In an aspect, recovering the pre-TM values from the HB entries having their PTM bit set to 1, includes setting the RP bits 616 of these HB entries (e.g., upon the flush instruction dispatch) to 1 indicating a restore. In certain aspects, a flush in the middle of a transaction (e.g., while in the TM mode) may be handled like a regular flush.

In certain aspects, if the transaction passes all HB entries that have their PTM bits 619 set to 1 may be de-allocated, if those entries are already completed. Then all PTM bits 516 of the RF GPR 216 and all PTM bits 619 of the HB 214 may be reset to 0 (e.g., unmarked) indicating that all registers are now outside of the transaction. The transaction pass indicates that the sate of the transaction is the architected state and not speculative anymore.

In certain aspects, if the transaction fails (e.g., due to an exception), it may be aborted, for example, by issuing a TAbort. When the transaction is aborted, all registers are recovered to their pre-TM states normally and all PTM bits 516 of the RF GPR 216 and all PTM bits 619 of the HB 214 may be reset to 0, indicating that all registers are now outside the transaction. In an aspect, aborting any nested transaction within the outer traction may lead to the aborting of the outer transaction.

In certain aspects, as noted above, any HB entry with its PTM bit 619 set to 1 may not be de-allocated as long as the transaction is pending. In an aspect, if an HB entry with its PTM bit 619 is completed while inside the transaction, the HB entry may be marked with a special bit to indicate that the HB entry is already completed. When the transaction is completed successfully (i.e., TM passes), then these completed HB entries may be de-allocated from the HB 214.

In an aspect, once the PTM bits have been cleared, the normal completion rules may apply.

FIG. 11 illustrates operations 1100 for managing a speculative transaction in a processing unit, in accordance with certain aspects of the present disclosure. Operations 1100 may begin, at 1102 by initiating the speculative transaction by dispatching a first instruction indicating start of the speculative transaction. At 1104, the processing unit may make one or more RF entries as PTM, in response to the initiating. AT 1106, the processing unit may dispatch at least one second instruction targeting at least one of the marked RF entries, while the transaction is active, the at least one second instruction writing new result data into the at least one RF entry. At 1108, the processing unit may save previous result data evicted from the at least one RF entry by the new result data, into a history buffer entry. At 1110, the processing unit may mark the HB entry as PTM, in response to the saving, wherein the processing unit, upon detecting a trigger, is configured to rollback to a state before the initiating the transaction by restoring the previous result data to the at least one RF entry.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing a speculative transaction in a processing unit, comprising:

initiating the speculative transaction by dispatching a first instruction indicating start of the speculative transaction;

identifying one or more register file (RF) entries storing data for the processing unit prior to initiating the speculative transaction;

marking, in response to the initiating, the identified one or more RF entries by changing the state of a pre-transaction memory (PTM) bit associated with the one or more RF entries to indicate that the data stored in a respective RF entry is PTM;

dispatching at least one second instruction targeting a first RF entry of the one or more RF entries, while the speculative transaction is active, the at least one second instruction writing new result data into the first RF entry;

saving first previous result data evicted from the first RF entry by the new result data, into a first history buffer (HB) entry;

marking the first HB entry as PTM by changing the state of a first PTM bit associated with the first HB entry, in response to the saving; and dispatching a third instruction targeting the first RF entry, while the speculative transaction is active, the third instruction writing new result data into the first RF entry, and in response saving second previous result data evicted from the first RF entry into a second HB entry, without changing the state of a second PTM bit associated with the second HB entry, wherein the processing unit, upon detecting a trigger, is configured to rollback to a state before the initiating the speculative transaction by restoring the first previous result data to the first RF entry.

2. The method of claim 1, wherein the trigger comprises detecting that the speculative transaction is aborted, the method further comprising: restoring previous result data to the first RF entry; and unmarking one or more marked RF entries and the marked HB entry.

3. The method of claim 2, wherein the unmarking comprises resetting one or more PTM bits corresponding to the one or more marked RF entries and the marked HB entry to zero.

4. The method of claim 1, wherein the trigger comprises detecting a flush operation corresponding to the first instruction indicating the start of the speculative transaction, the method further comprising: restoring previous result data to the first RF entry; unmarking the one or more marked RF entries and the marked HB entry; and de-allocating one or more HB entries that are not marked as PTM.

5. The method of claim 1, wherein the processing unit is part of a multi-slice processor comprising a first slice and a second slice, wherein the first RF entry is available to the first slice and not available to the second slice, and wherein the first HB entry is available to both the first slice and the second slice.

6. The method of claim 1, further comprising: detecting that the speculative transaction has passed; deallocating the marked HB entry; and unmarking the one or more marked RF entries and the marked HB entry.

7. The method of claim 1, further comprising aborting the speculative transaction if a nested transaction within the speculative transaction is aborted.

8. The method of claim 1, wherein the one or more marked RF entries as PTM indicates that the previous result data is to be saved into the second HB entry upon eviction from the one or more marked RF entries.

9. The method of claim 1, wherein marking each of the one or more RF entries as PTM comprises setting a PTM bit of the one or more RF entries to one.

10. The method of claim 1, wherein the marked HB entry as PTM indicates that the previous result data saved in the second HB entry is to be restored to the first RF entry upon detecting the trigger.

11. The method of claim 1, wherein marking the HB entry as PTM comprises setting a PTM bit of the one or more RF entries to one.

12. The method of claim 1, wherein the first HB entry is not de-allocated while the first HB entry is marked PTM.

13. An apparatus for managing a speculative transaction in a processing unit, comprising:
    means for initiating the speculative transaction by dispatching a first instruction indicating start of the speculative transaction;
    means for identifying one or more register file (RF) entries storing data for the processing unit prior to initiating the speculative transaction;
    means for marking, in response to the initiating, the identified one or more RF entries by changing the state of a pre-transaction memory (PTM) bit associated with the one or more RF entries to indicate that the data stored in a respective RF entry is PTM;
    means for dispatching at least one second instruction targeting a first RF entry of the one or more RF entries, while the speculative transaction is active, the at least one second instruction writing new result data into the first RF entry;
    means for saving first previous result data evicted from the first RF entry by the new result data, into a first history buffer (HB) entry;
    means for marking the first HB entry as PTM by changing the state of a first PTM bit associated with the first HB entry, in response to the saving;
    means for dispatching a third instruction targeting the first RF entry, while the speculative transaction is active, the third instruction writing new result data into the first RF entry, and in response saving second previous result data evicted from the first RF entry into a second HB entry, without changing the state of a second PTM bit associated with the second HB entry; and
    means for, upon detecting a trigger, rolling back the processing unit to a state before the initiating the speculative transaction by restoring the first previous result data to the at first RF entry.

14. The apparatus of claim 13, wherein the trigger comprises detecting that the speculative transaction is aborted, the apparatus further comprising: means for restoring previous result data to the first RF entry; and means for unmarking one or more marked RF entries and the marked HB entry.

15. The apparatus of claim 14, wherein the means for unmarking is configured to reset PTM bits corresponding to the one or more marked RF entries and the marked HB entry to zero.

16. The apparatus of claim 13, wherein the trigger comprises detecting a flush operation corresponding to the first instruction indicating the start of the speculative transaction, the apparatus further comprising:
    means for restoring previous result data to the first RF entry; and means for unmarking the one or more marked RF entries and the marked HB entry.

17. The apparatus of claim 16, further comprising means for de-allocating one or more HB entries that are not marked as PTM.

18. The apparatus of claim 13, further comprising:
    means for detecting that the speculative transaction has passed;
    means for de-allocating the marked HB entry; and means for unmarking the one or more marked RF entries and the marked HB entry.

19. The apparatus of claim 13, further comprising means for aborting the speculative transaction if a nested transaction within the speculative transaction is aborted.

20. A computer program product for managing a speculative transaction in a processing unit, the computer program product comprising:
    a computer-readable storage medium having computer-readable program code embodied therewith for performing method steps comprising:
    initiating the speculative transaction by dispatching a first instruction indicating start of the speculative transaction;
    identifying one or more register file (RF) entries storing data for the processing unit prior to initiating the speculative transaction;
    marking, in response to the initiating, the identified one or more RF entries by changing the state of a pre-transaction memory (PTM) bit associated with the one or more RF entries to indicate that the data stored in a respective RF entry is PTM;
    dispatching at least one second instruction targeting a first RF entry of the one or more RF entries, while the speculative transaction is active, the at least one second instruction writing new result data into the first RF entry;
    saving first previous result data evicted from the first RF entry by the new result data, into a first history buffer (HB) entry;
    marking the first HB entry as PTM by changing the state of a first PTM bit associated with the first HB entry, in response to the saving; and
    dispatching a third instruction targeting the first RF entry, while the speculative transaction is active, the third instruction writing new result data into the first RF entry, and in response saving second previous result data evicted from the first RF entry into a second HB entry, without changing the state of a second PTM bit associated with the second HB entry,
    wherein the processing unit, upon detecting a trigger, is configured to rollback to a state before the initiating the speculative transaction by restoring the first previous result data to the first RF entry.

* * * * *